United States Patent
Cortesi et al.

(10) Patent No.: US 10,408,951 B2
(45) Date of Patent: Sep. 10, 2019

(54) RADIATION DETECTOR

(71) Applicant: Board of Trustees of Michigan State University, East Lansing, MI (US)

(72) Inventors: Marco Cortesi, East Lansing, MI (US); John E. Yurkon, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 0 days.

(21) Appl. No.: 15/405,889

(22) Filed: Jan. 13, 2017

(65) Prior Publication Data

US 2017/0219720 A1   Aug. 3, 2017

Related U.S. Application Data (60) Provisional application No. 62/288,619, filed on Jan. 29, 2016.

(51) Int. Cl.
 *G01T 1/20*    (2006.01)
 *G01T 1/205*   (2006.01)
 *G01T 1/29*    (2006.01)

(52) U.S. Cl.
 CPC ............ *G01T 1/205* (2013.01); *G01T 1/2018* (2013.01); *G01T 1/2935* (2013.01)

(58) Field of Classification Search
 CPC ....... G01T 1/204; G01T 1/2045; G01T 1/202; G01T 1/178; G01T 1/2985
 See application file for complete search history.

(56) References Cited

U.S. PATENT DOCUMENTS

| | | | | |
|---|---|---|---|---|
| 4,524,275 A | * | 6/1985 | Cottrell | H01J 49/30 250/298 |
| 5,149,966 A | * | 9/1992 | Silari | H01J 49/44 250/305 |
| 5,659,170 A | * | 8/1997 | Da Silveira | H01J 49/08 250/281 |
| 5,739,529 A | * | 4/1998 | Laukien | H01J 49/065 250/282 |
| 6,878,944 B1 | * | 4/2005 | Gerstenmayer | G01T 1/2935 250/374 |
| 7,518,117 B2 | * | 4/2009 | Bryman | G01T 1/1603 250/370.1 |
| 8,507,845 B2 | | 8/2013 | Blick et al. | |
| 8,779,371 B2 | | 7/2014 | Moriya et al. | |
| 8,890,086 B1 | | 11/2014 | Goldberg et al. | |
| 9,123,521 B2 | | 9/2015 | Verenchikov | |

(Continued)

OTHER PUBLICATIONS

Stelzer "Some Recent Developments in Nuclear Charged Particle Detectors" Nuclear Physics A354(1981), p. 433c-446c.*

(Continued)

*Primary Examiner* — David P Porta
*Assistant Examiner* — Mamadou Faye
(74) *Attorney, Agent, or Firm* — Harness, Dickey & Pierce, PLC (57) ABSTRACT

A radiation detector is provided. In a further aspect, a detector employs a Parallel Plate Avalanche Counter ("OP-PAC") which includes an anode film, a parallel cathode film and multiple optical photo-detectors, such as photo-sensors and/or photo-multipliers. A method of using a radiation detector is also provided.

27 Claims, 8 Drawing Sheets

(56) References Cited

U.S. PATENT DOCUMENTS

| | | | |
|---|---|---|---|
| 2004/0061047 A1* | 4/2004 | Bolozdynya | G01T 3/00 250/251 |
| 2010/0156410 A1* | 6/2010 | Fuke | G01N 24/002 324/307 |
| 2011/0155918 A1* | 6/2011 | Bouhnik | G01T 1/249 250/370.14 |
| 2011/0284757 A1* | 11/2011 | Butuceanu | A61N 5/1048 250/389 |
| 2012/0256082 A1* | 10/2012 | Masujima | H01J 49/4225 250/282 |
| 2013/0334429 A1* | 12/2013 | Fukuchi | G01T 1/1642 250/363.03 |
| 2015/0041665 A1* | 2/2015 | Hollebeek | G01T 1/2935 250/375 |
| 2017/0154916 A1* | 6/2017 | Mori | H01L 27/14663 |

OTHER PUBLICATIONS

Mantovan, R. et al., "Development of a parallel-plate avalanche counter to perform conversion electron Mössbauer spectroscopy at low temperatures," Review of Scientific Instruments, Jun. 6, 2007, 5 pages.

Cub, J. et al., "A position sensitive parallel plate avalanche counter for single particle and current readout," Nuclear Instruments and Methods in Physics Research Section A, Mar. 29, 2000, pp. 522-524.

Swan, D. et al., "A simple two-dimensional PPAC," Nuclear Instruments and Methods in Physics Research Section A, 1994, pp. 314-317.

Clark, J., "The Mass Spectrometer," www.chemguide.co.uk, Feb. 2015, 11 pages.

Knoll, G., "Radiation Detection and Measurement, Chapters 5 and 6," John Wiley & Sons, published 1989, 14 pages.

Anonymous, "Orbitrap," en.wikipedia.org, Mar. 20, 2015, 7 pages.

Anonymous, "Fourier transform ion cyclotron resonance," en.wikipedia.org, Jul. 5, 2015, 9 pages.

NSCL Charge-Exchange Group, "Tools," groups.nscl.msu.edu. Jan. 26, 2013, 3 pages.

Hamamatsu, "MPPC (multi-pixel photon counter)," www.hamamatsu.com, Nov. 2009, 5 pages.

Sensl Sense Light, "Introduction to the SPM-Technical Note," www.sensl.com/documentation, published prior to Jan. 29, 2016, 8 pages.

Excelitas Technologies, "Short Wavelength Enhanced Silicon Avalanche Photodiode," www.excelitas.com, May 2014, 4 pages.

Input to the 2014 Nuclear Astrophysics and Low Energy Nuclear Physics Town Meeting, "The Gamma-Ray Energy Tracking Array Greta," Texas A&M University, Aug. 21-23, 2014, 25 pages.

\* cited by examiner

RADIATION DETECTOR

CROSS REFERENCE TO RELATED APPLICATIONS

This application claims the benefit of U.S. Provisional Application No. 62/288,619, filed on Jan. 29, 2016. The entire disclosure of the above application is incorporated herein by reference.

STATEMENT OF GOVERNMENT INTEREST

This invention was made with government support under PHY 1102511 awarded by the National Science Foundation. The government has certain rights in the invention.

BACKGROUND

The present invention generally pertains to a radiation detector and more particularly to an optical parallel-plate avalanche counter ("OPPAC").

When traversing a material (gas, liquid or solid), a penetrating charged particle collides with the atoms or molecules of the medium and ionizes them to produce a trail of electron-ion pairs along its track. In conventional proportional gaseous counters ("PC"), upon the action of an electric field, charges are accelerated and drifted towards electrodes; positive ions move along the field direction while the electrons move opposite to it. When the electric field is strong enough, electrons reach high kinetic energies between collisions and eventually their energies exceed the ionization potential of gas molecules. This results in a further ionization that leads to an electron multiplication cascade known as a Townsend avalanche. The localization of the impinging particle in a position-sensitive proportional counter ("PSPC") is determined from the amplitudes of signals on segmented/pixelated readout electrodes. For instance, the localization capability of a conventional two-dimensional Parallel Plate Avalanche Chamber ("2D-PPAC") is based on recording the charge signals induced on two orthogonal striped readout foils connected to a resistive divider chain, on either side of a central biased electrode. The four signals at the ends of the two chains are amplified, shaped and the peak voltages recorded. The X and Y position is encoded in the ratio of the charges appearing at each end of the resistor chain (in a charge division method). Alternatively, the electrode strips may be connected to multi-tapped delay-lines, and the position is determined from the time difference between signals appearing at either end.

The localization capability of the PPAC is limited by the granularity of the readout foils; the latter usually consisting of stretched polymer (for example, polypropylene) films striped by evaporating a thin metal (for example, Au or Al) layer through a mask. Strips with a sub-millimeter gap and a center-to-center separation below of 1 mm are difficult to realize, so that best position resolutions are of 1 mm or above, depending on the charge readout methods, the geometry of the strip readout, and the identity of the impinging particle. The main limitation of PPAC is their tendency to discharge at high-gain operation; due to the large energy stored in the detector, a spark can damage both the detector and the readout electronics. The counting rate capability of conventional PPACs with a charge-division readout method is limited to a few tens of KHz, while the delay-line PPAC is of a few hundred of KHz. However, delay-line PPAC have generally lower detection efficiency due to a worse signal-to-noise ratio compared to charge-division PPAC.

Examples of conventional PPAC detectors are discussed in: Mantovan, R. et al., "Development of a Parallel-Plate Avalanche Counter to Perform Conversion Electron Mössbauer Spectroscopy at Low Temperatures," Rev. Sci. Instrum. 78, 063902 (Jun. 6, 2007); Cub, J. et al., "A Position Sensitive Parallel Plate Avalanche Counter for Single Particle and Current Readout," Nucl. Instr. and Meth. A 453 (2000) 522-524; and Swan, D. et al., "A Simple Two-Dimensional PPAC," Nucl. Instr. and Meth. A 348 (1994) 314-317.

SUMMARY

In accordance with the present invention, a radiation detector is provided which detects ionizing radiation. In a further aspect, a radiation detector employs an Optical Parallel Plate Avalanche Counter ("OPPAC") which includes an anode film, a parallel cathode film and multiple optical or photo-detectors, such as avalanche photodiodes ("APD") or silicon photo-multipliers ("SiPM"). A method of using a parallel-plate avalanche counter is also provided. Additional features and advantages will be apparent from the following description and appended claims.

DETAILED DESCRIPTION

Referring to FIGS. 1-4, 8 and 11, the present radiation detector 21 is also known as an Optical Parallel Plate Avalanche Counter 23. OPPAC 23 further includes:

a) two parallel thin and conductive electrode films or foil sheets 25, separated by a small gap for example 10 mm or less (preferably 3 mm or less), filled with a scintillating gas mixture 27;

b) a uniform electric field between the two parallel electrodes 25, such that an electron avalanche, either in proportional or in streamer mode, is established within the gas gap when an ionizing radiation traverses the detector active volume;

c) arrays of small (approximately 3 mm$^2$) collimated photo-detectors 31, preferably solid-state photo-sensors, such as Silicon-Photomultipliers ("SiPM"), Avalanche PhotoDiodes ("APD"), etc., or position-sensitive gas photo-multipliers ("PSGPM"), arranged along the 4 sides of the parallel plate detector geometry;

d) a programmable controller 33, such as a computer with a CPU and memory, operating a dedicated data-acquisition system, which processes electroluminescence signals from photo-sensors or PSGPM 31, thereby sensing and determining a position of an original impinging charged particle 35; and e) a dedicated algorithm used by controller 33 for precise localization of impinging ionizing radiation particle 35, based on processing the electroluminescence signals from photo-sensors PSGPMs 31.

The SiPM and APD photo-sensors have many advantages over other types of photon detectors (e.g., vacuum PMTs), such as small size, low bias, uniformity, compactness, and insensitivity to magnetic fields. They also offer a flexibility in the creation of 2D imaging arrays. Exemplary photo-sensors can be obtained from Hamamatsu Photonics K. K. (a Multi-Pixel Photon Counter ("MPPC") , and Excelitas Technologies Corp. (model APD—C30739E CERH Series), however, it should be appreciated that the specific photo-sensors to be used are chosen according to the emission spectrum of the scintillating gas mixture that fills the PPAC; for example, the Excelitas APD has a responsivity limited to the visible range and thus, is only desired for mixtures emitting in the visible range. The active surface of visible-sensitive silicon photo-detectors (for example, SiPM or APD) are generally separated from an active volume 47 by a protective glass window, while UV-sensitive devices do not typically employ windows in order to prevent losing the short wavelength photons. Furthermore, the position-sensitive gas photo-multiplier uses a quartz window to separate its active volume from the PPAC. Examples of GPMs may include position-sensitive micro-pattern gaseous detectors (such as micromegas, gas electron multiplier, and the like) coupled to suitable photo-cathodes (for example, CsI for UV-light detection), in which the photon-induced avalanche is localized by a segmented anode with appropriate readout-electronic displays or indicators.

The pressure (for example, 3 torr to 10 bar) and type of the scintillating gas that fills the detector depends on the requirement of the specific application and the experimental conditions, which include low operating voltage, high charge/scintillation yield, high rate capability, and good time resolution. Excellent scintillation yield may be provided by gas such as tetrafluoromethane ("$CF_4$"), and noble gas with admixture of triethylamine ("TEA"), or Tetrakis(dimethylamino)ethylene ("TMEA"), or $N_2$, $CO_2$, $CH_2$ or other scintillating gases. Pure noble gases, such as helium (He), argon (Ag) krypton (Kr) or xenon (Xe) are also efficient scintillating gases; in a wide range of electric field strength, avalanche electrons excite atoms of the noble gas that then forms excimers and emits a continuum (excimer continuum). However, noble gases generally emit at very short wavelengths (e.g., Ar and Xe excimer spectra peak at 120 and 178 nm, respectively), and consequently solid-state photo-sensors may require the use of wavelength-shifters such as tetraphenyl butadiene ("TPB") to guarantee a sufficient photon detection efficiency.

High scintillation yield at relevant detectable wavelength range can also be obtained from noble gases with small admixtures of certain impurities that shift the light to a more suitable range. For example, in the presence of a tiny amount of certain impurities, the excimer emission will be suppressed whereas the emission of the impurities' molecules will dominate. The primary noble gas acts as detector medium while the impurities as wavelength-shifter. On the other hand, GPMs with CSL photocathodes have high sensitivity or a high QE for the scintillation light emitted in the deep-UV range, and they can be used to detect directly electroluminescence from pure noble gases like pure Ar and Xe.

An anode foil film 25A and a cathode foil film 25C are stretched, coated with a thin (such as approximately 300 Angstrom) metal (Au or Al) layer, then adhered to opposite outside surfaces of one or two printed circuit boards 41. Printed circuit board 41 has a substantially square shaped peripheral edge with a matching substantially square shaped internal edge defining a hollow opening when the films are secured thereto. Each foil film is preferably a polypropylene polymeric sheet less than 1 μm thick.

Parallel plate electrodes 25 can be glued on G10 printed circuit board 41 for a compact and robust assembly. The four arrays of collimated photo-sensors 31 are sandwiched between the two G10 boards 41 or attached to a single printed circuit board 41, and the full assembly is made vacuum-tight using rubber O-ring seals, plastic/metal gasket sealants or adhesives compounds (such as a Hylomar material) within an optimal thin metal housing or case 54 for a gamma Compton camera system (see FIG. 11).

Printed circuit board 41 acts as an insulator material and a support frame, however a ceramic insulator and support frame can alternately be used since it exhibits relatively low outgassing to avoid degrading operation of the PPAC detector. Alternate insulator frame materials can be used such as other polymers, Teflon, glass and the like. The plurality of photo-sensors 31 are attached to printed circuit board 41 so as to essentially surround all four sides of the central opening therein. For use in detecting heavily charged particles, such as beam monitoring for hadrontherapy applications (e.g., proton, carbon, oxygen and the like), a low-mass OPPAC detector using thin electrode foils and low gas pressure of 5-20 torr (depending on the type of gas mixtures used) is employed to reduce beam straggling. However, if the OPPAC is used for gamma detection, such as a scatter detector in a Compton camera, high pressure of 5-10 bar is desired in order to achieve high detection efficiency; higher pressure means more gas molecules with which the gamma, to be detected, can interact.

Upstanding collimating walls 49 separate and are located between each adjacent pair of photo-sensors 31, and each wall 49 is elongated and open toward an internal open edge 51 (in other words, central area) of the insulator or printed circuit board 41. The visible component of the scintillation light created during the avalanche is reflected between the metalized electrode foils 25 and guided toward photo-sensor arrays 31. In addition, collimator walls 49 can be made of polished aluminum and/or Teflon, such that visible or UV light is guided towards photo-sensors 31 by multiple reflections at the collimator walls, leading to higher photo-collection efficiency. The collimation of the individual photo-sensor is used since it narrows down the detected electroluminescence light, as can be observed in FIG. 4.

The OPPAC operational principle and performance will now be discussed. The operational principle of a OPPAC 21 is significantly different from the one of a kind conventional Parallel-Plate Avalanche Counters in that the particle localizations are based on detecting electroluminescent light instead of avalanche charges. An inelastic collision between electrons and gas molecules during the avalanche process, even at a moderate value of an electric field, results in the creation of excited states, which return to a ground level with an emission of photons (scintillation). A light yield increases with the field and is very large when copious charge multiplication is attained during the electron avalanche process (known as secondary scintillation or electroluminescence). The light yield and the emission spectra are characteristic of each filling gas and depend on several parameters, including reduced electric field (E/p), absolute pressure, amount of contaminants (i.e., impurities), among other factors. Particle detectors based on a secondary scintillation mechanism are known as scintillation proportional counters. Scintillation denotes a process whereby light of a characteristic spectrum (such as a characteristic range of wavelengths or energies) is emitted following an absorption of ionizing radiation.

Figures 1, 2:
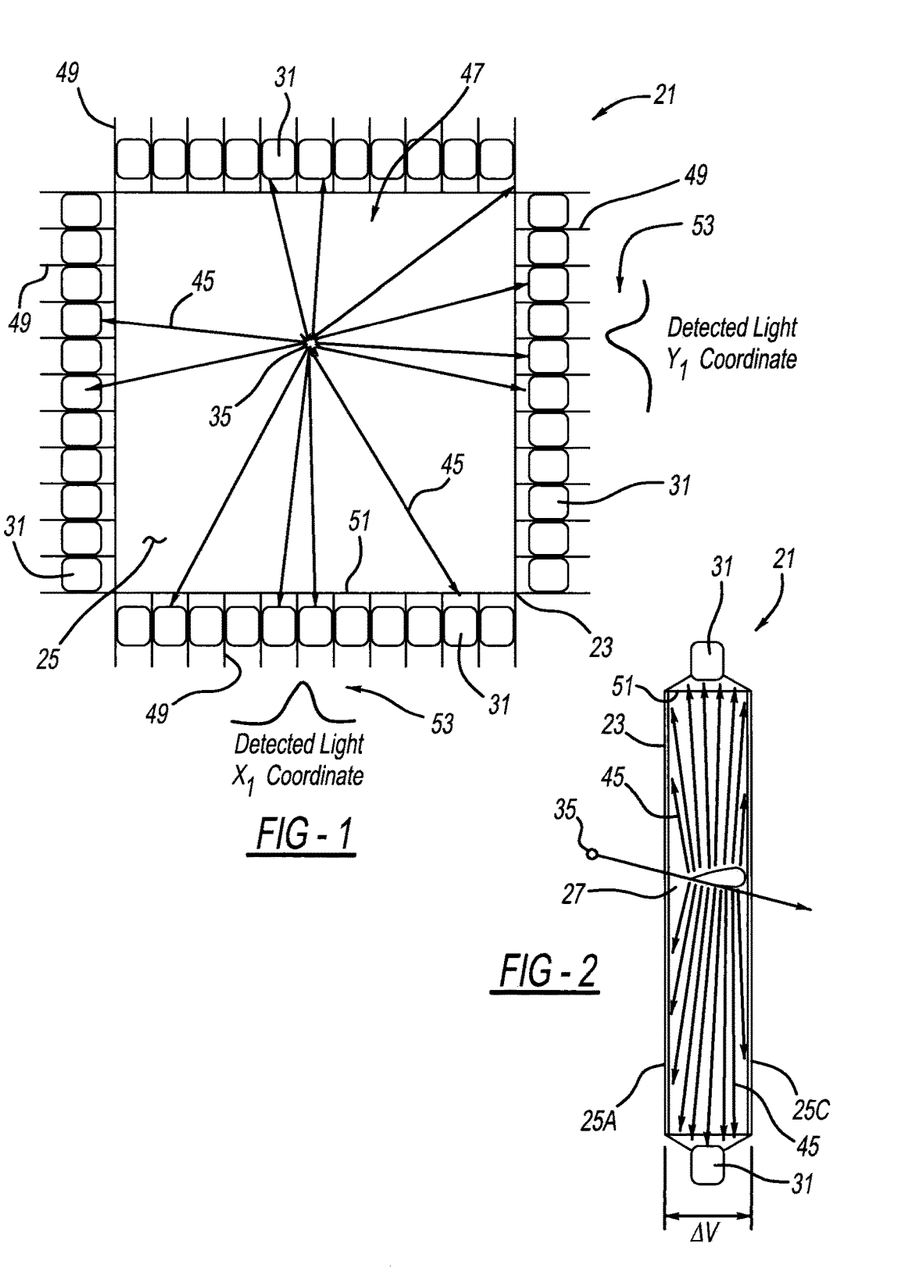
FIG. 1 is a diagrammatic front view showing the present radiation detector, also known as an Optical Parallel Plate Avalanche Counter.
FIG. 2 is a diagrammatic side view showing the OPPAC.
Figure 3A:
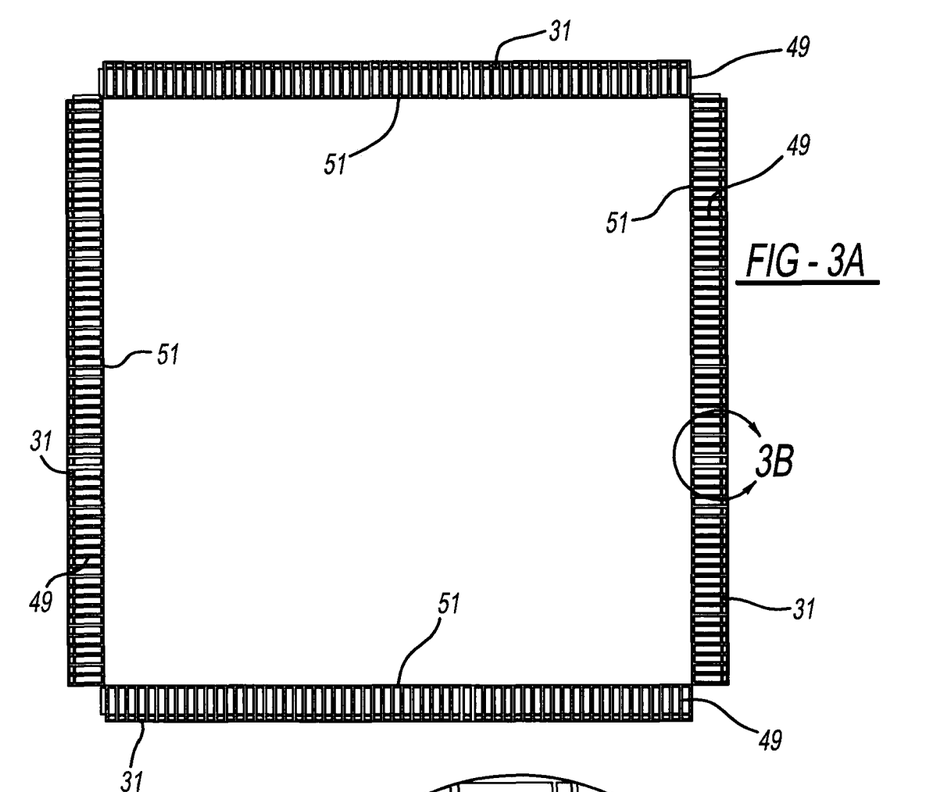
FIG. 3A is a front elevational view showing the OPPAC.
Figure 3B:
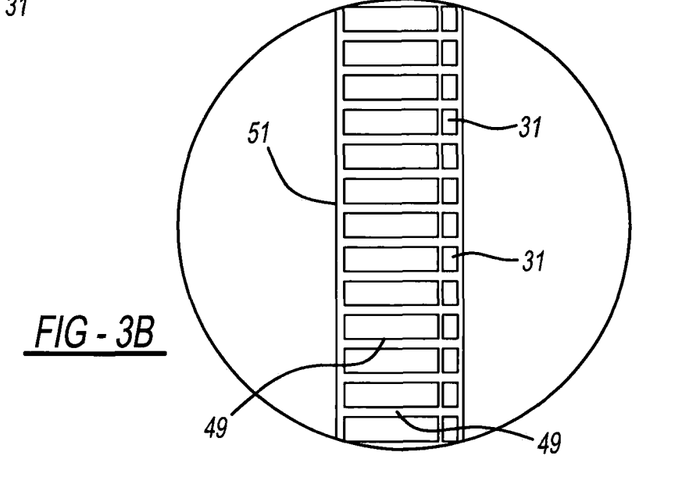
FIG. 3B is an enlarged front elevational view, taken within circle 3B of FIG. 3A, showing a portion of the OPPAC.
Figure 4:
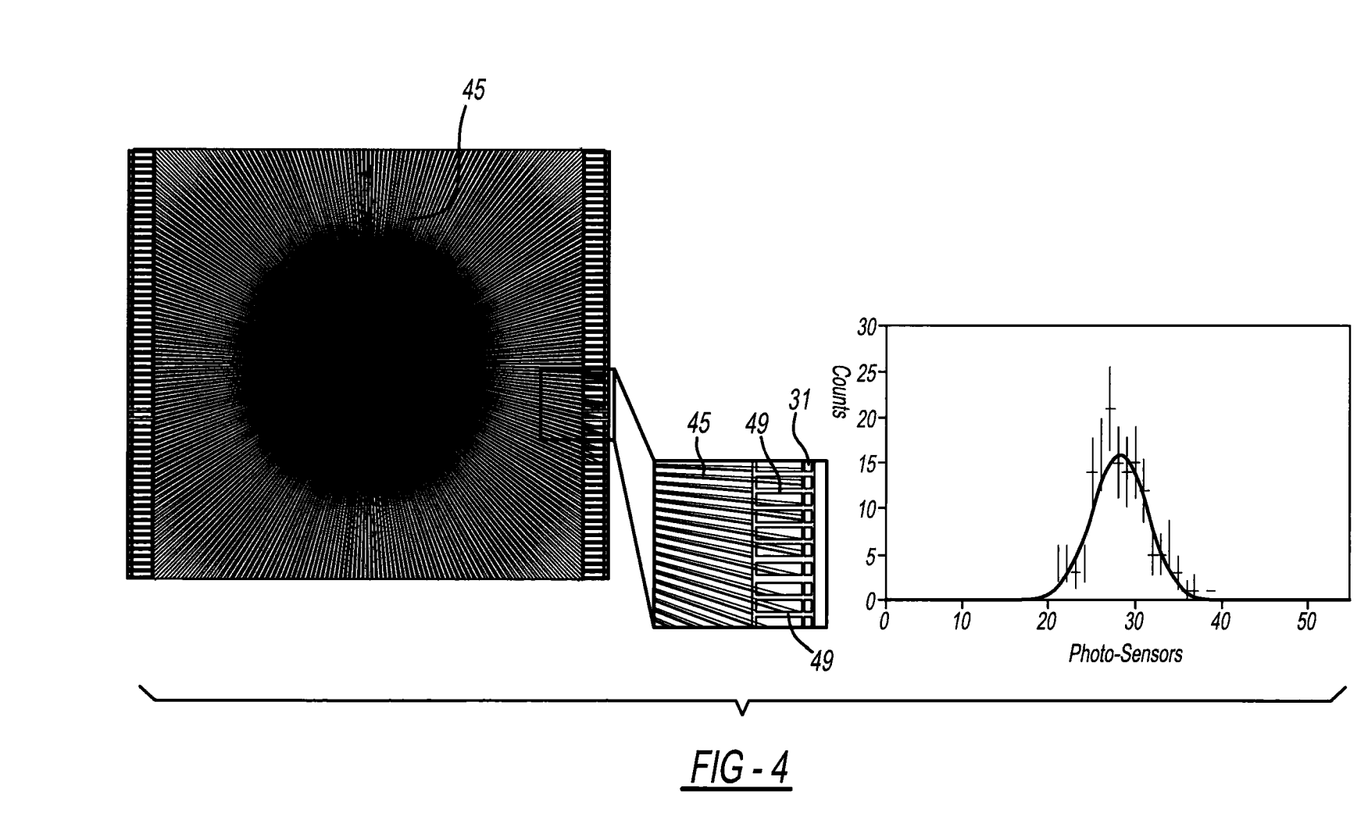
FIG. 4 is a diagrammatic front view showing charge particles interacting with the OPPAC, and a graph of associated UV photons expected to be detected by a single APD array along one coordinate.
Figure 5:
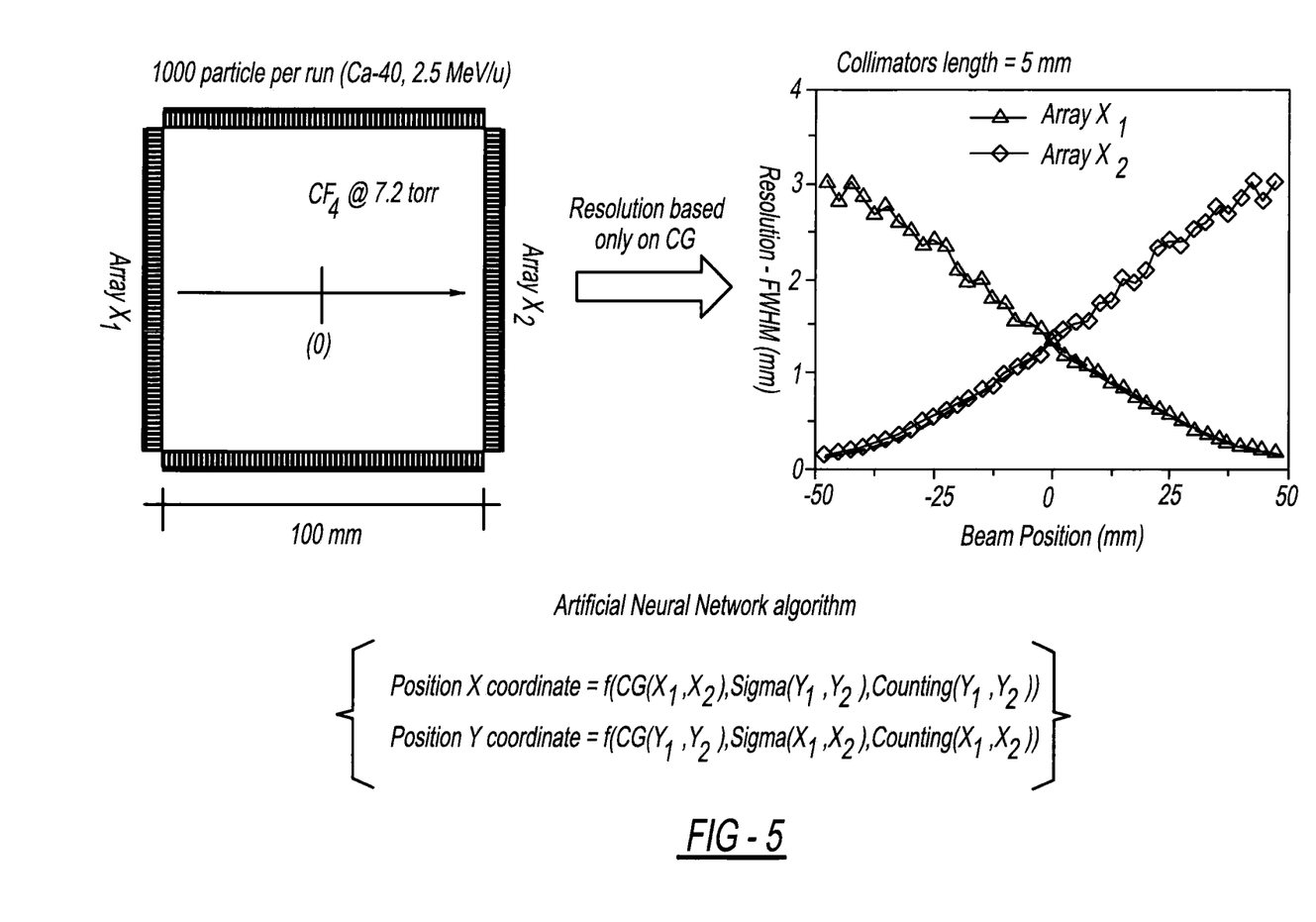
FIG. 5 is a simulation of expected results using the OPPAC.

Charged particle 35 crossing gas gap between two parallel plates releases a small amount of energy in the form of ionization electrons. These charges are drift and multiplied in the gas gap 145 by the action of the uniform electric fields established between parallel plates 25A and 25C. Scintillation light 45, produced during the avalanche/discharge processes, is detected by the array of collimated photo-sensors 31 displayed along the gas-gap area. Photo-sensors 31 send corresponding electrical signals to controller 33 and the position of the particle is computed as the center of gravity measured by the arrays of photo-sensors. Moreover, a better localization capability may be achieved with an algorithm that also includes the total amount of light detected per array, a center of gravity of the light, and dispersion of the light—the quantities of which are proportional to the distance of the charged particle track from the photo-sensor array. Such an algorithm is stored in non-transient computer memory (e.g., RAM or ROM) and is contained within programmed instructions for use by a microprocessor in controller 33 (see FIG. 8). FIG. 5 shows the results of a Monte Carlo simulation in which the spatial resolution (Full Width Half Maximum ("FWHM")) is computed from the secondary scintillation light distribution detected by two opposite arrays of photo-sensors, as a function of the different positions of the impinging charged particle on the OPPAC active area. In this case, the localization of the impinging particle is based on estimating the center of gravity of the scintillation light detected by the array of photo-sensors. Furthermore, FIG. 5 shows that the combination of the information received by the electronic controller from the two arrays of photo-sensors is expected to provide a good localization capability (with the position resolution equal to or below 1 mm). However, there is a certain inhomogeneity across the active area if the localization of the impinging particle is based only in the center of gravity of the detected light distribution; the closer the avalanche is to the photo-sensors, the better the spatial resolution. But, using the algorithm in the controller that combines different information from the detected distribution of scintillation photons will help to at least partially overcome or reduce this inhomogeneity. Such an algorithm in the programmed software instructions for use by a microprocessor in controller 33 is disclosed in FIGS. 5 and 8.

Figure 8:
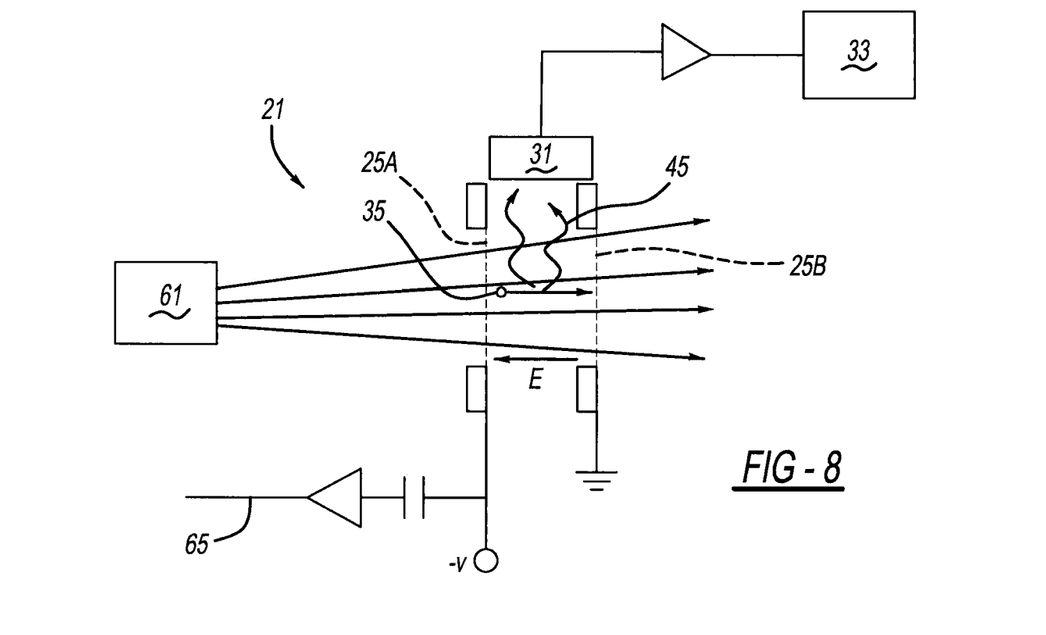
FIG. 8 is a schematic diagram showing the OPPAC.
Figure 9:
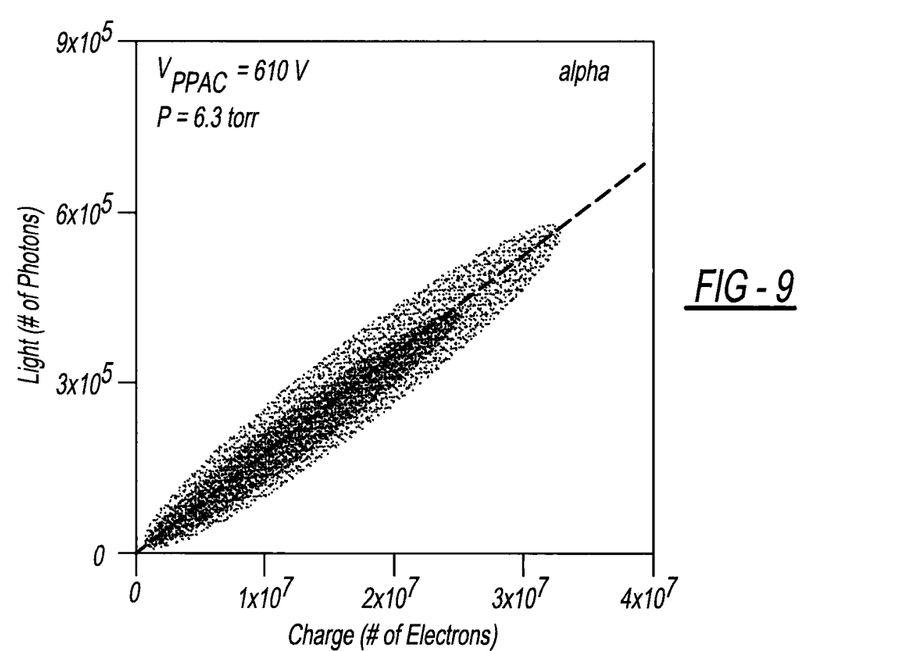
FIG. 9 is a graph showing expected results of light versus charge using the OPPAC.

FIG. 8 illustrates an experimental setup and the light-charge correlation data between the scintillation light and the avalanche charge, expected with a small OPPAC prototype 21 operating in $CF_4$ at a pressure of 6.3 torr. OPPAC 21 includes two small meshes 25 (Ø=3 cm) separated by a 3 mm gas gap; a voltage difference of 610 volt is applied between the two parallel electrodes 25 and the detector is irradiated with 5.5 MeV alphas using a collimated 241-Am source 61. A single 3×3 mm² SiPM detector 31 (preferably a UV-sensitive MPPC model 3×3 mm-50 µm from Hamamatsu) is placed between the two meshes. Light signals from the MPPC and the charge signals from the PPAC, were acquired through decoupling capacitors and fed to integrating preamplifiers —an Ortec model 109A and a Canberra model 2005, respectively. For each alpha crossing the OPPAC effective volume, both charge and light are simultaneously recorded and associated signals are sent from detector 31 to controller 33. As shown in FIG. 9, a good correlation between total avalanche charges collected at the anode and scintillation light recorded by the photo-sensor is expected. The measured secondary scintillation yield in $CF_4$ is expected to be around 0.05-0.15 photons/electron, depending of the gas pressure, the electric field applied across the PPAC and residual gas impurities.

The OPPAC can be operated in two different modes: proportional gas amplification and Geiger discharge (also known as streamer mode). In the proportional gas amplification mode, the gas multiplication linearly depends on the electric field strength applied between the electrodes and the total collected charges/scintillation photons are proportional to the total number of ion pairs originally created by the incident radiation. In addition, in the parallel plate configuration, the total avalanche charge depends on where the primary electrons are deposited. In Geiger discharge or streamer mode, however, the voltage difference applied between the two opposed electrodes is such that a transition from avalanches to sparks occurs via a streamer mechanism. The discharge stops when the operating potential, applied to the electrodes through a high value resistor, drops below a critical value for maintaining the condition of charge multiplication. The Geiger discharge mode provides very large charge pulses, typically above $10^9$ electrons, which in turn, produces an enormous amount of light thereby allowing tighter collimation and thus much better position resolution. In addition, this approach provides an infinite dynamic range, since all the particles depositing any amount of primary ionization (basically down to single photoelectrons) will trigger the discharge and thus will be detected. To avoid permanent damage during the Geiger discharge operation, the two parallel plate electrodes can be made of thin, robust substrate materials such glass, Ti-foils, ceramic or the like.

The present OPPAC can be used in a wide variety of applications because of some noteworthy advantages, such as fast pulse propagation (based on good time resolution), insensitivity to electronic noise or RF pick-up problems (since the readout is electrically decoupled from the active volume where the energy is deposited), no space charge limitations (which allows high counting rate and large dynamic range with respect to the particle's mass and energy), and good detection efficiency due to a large light yield. Such applications include use as a transmission detector for identification of heavy ions in spectrometers, since it provides fast timing with minimal straggling on the impinging beam, or as an endcap detector for a large volume drift and time projection chamber. In medical physics, the OPPAC can be used as a position-sensitive transmission detector for beam diagnostics in hadron-therapy applications, including event-by-event tagging of a primary beam particle, for an online beam monitor or fast-interlock, and for treatment plan optimization; the latter is achieved by systematic measurement with an OPPAC-based device on pre-treatment parameters such as patient-specific stopping properties, for indirect in-vivo range verification and low dose image guidance at the treatment site.

In addition, OPPACs can be used as sampling elements of heavy-ions range radiography with the aims measuring residual energy and position of a mono-energetic beam of protons or heavy-ions (carbon or oxygen) after passing through the target to be imaged (heavy-ion radiography/tomography). In this context, the device includes a stack of the OPPAC devices interleaved with removable absorber plates (tissue equivalent) of homogeneous thickness serving as the stopping material. Alternately, the present OPPAC can be used in radiation oncology applications and devices for treatment planning study, dosimetry applications and devices, and non-destructive imaging diagnostics such as radiography and tomography applications and devices.

Figure 7:
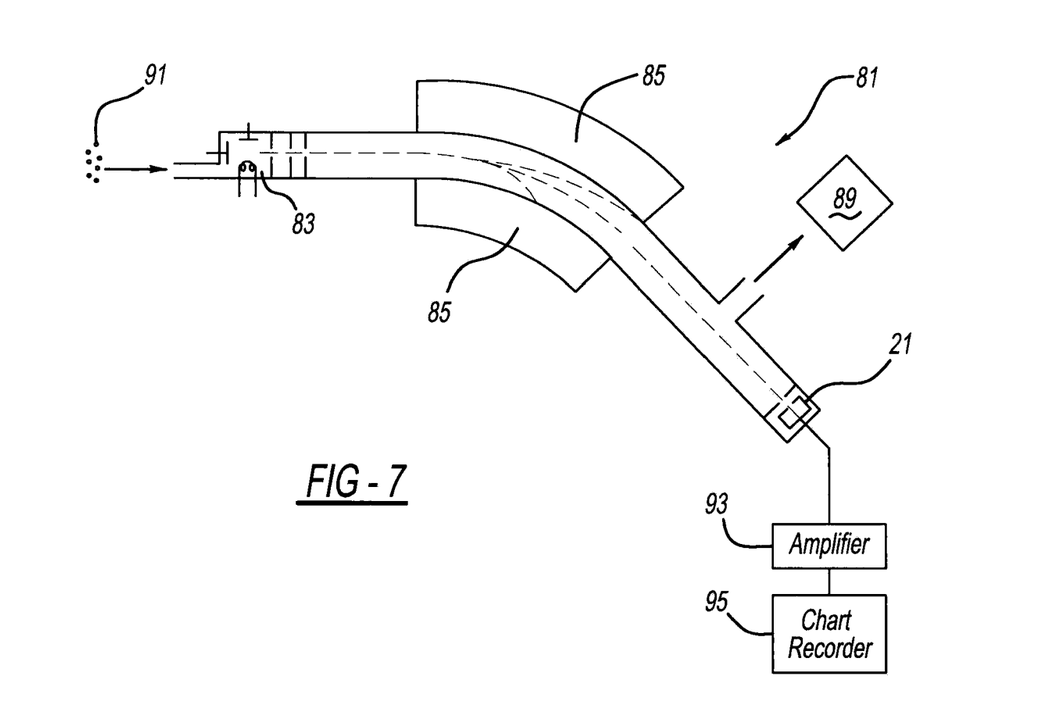
FIG. 7 is a diagrammatic view showing an exemplary mass spectrometer employing the OPPAC.

More specifically, FIG. 7 illustrates OPPAC detector 21 in a mass spectrometer 81. Mass spectrometer 81 includes an ionization chamber 83, an electromagnet 85, a deflector 87 and a vacuum pump 89. A vaporized sample 91 is ionized in chamber 83 and accelerated past electromagnets 85 and deflected as they travel to OPPAC 21. An output signal from the photo-sensors is amplified by an amplifier 93 and recorder by a chart recorder 95 associated with the programmable controller.

Figure 6:
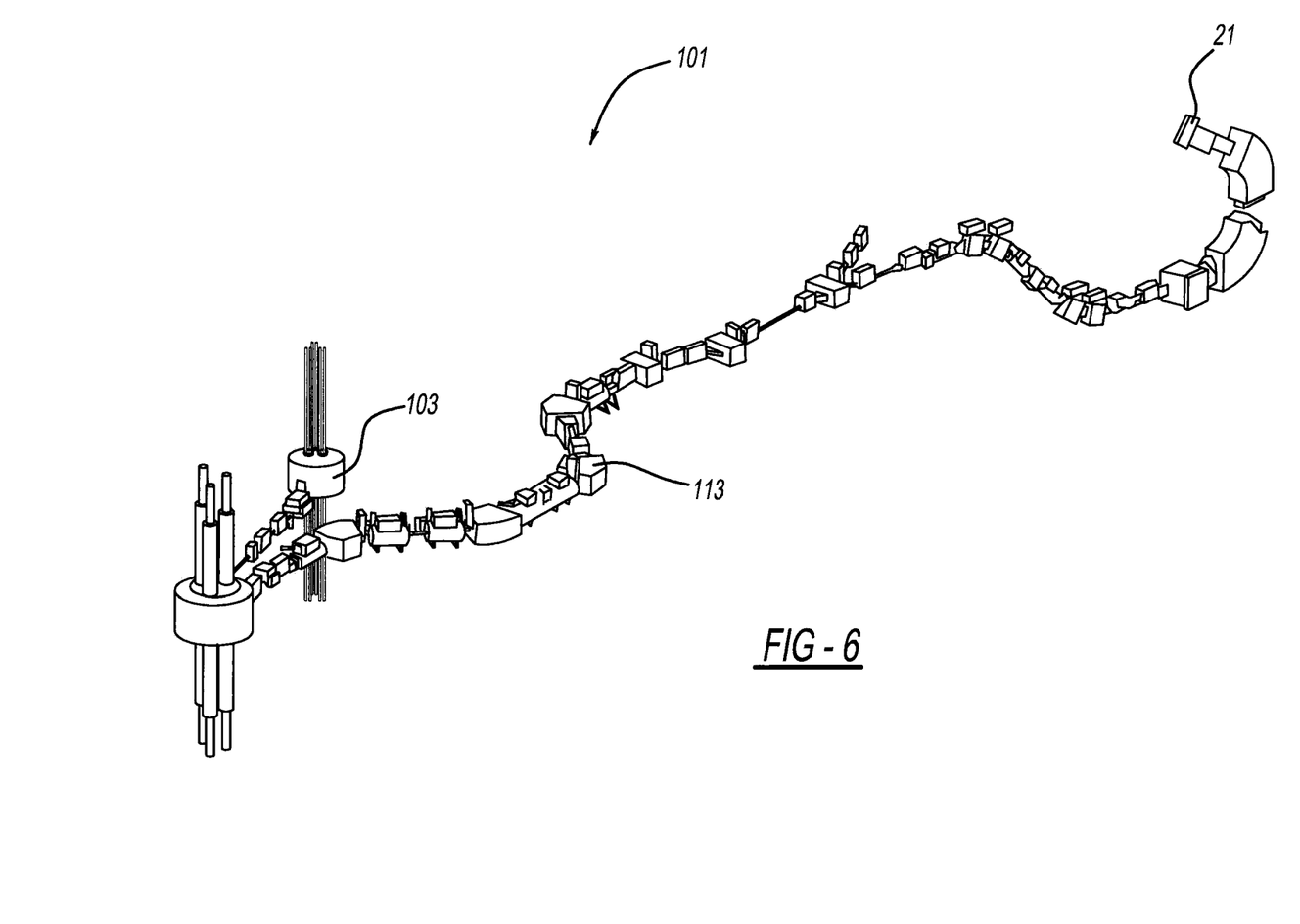
FIG. 6 is a diagrammatic perspective view showing an exemplary cyclotron system employing the OPPAC.

FIG. 6 shows OPPAC 21 employed in a superconducting particle accelerator system 101. A particle accelerator of system 101 includes a cyclotron 103 or a Van de Graaff generator. OPPAC 21 is located at a fragment separator 113 for tracking the horizontal and vertical position, and angle trajectory of the ion particles emitted through the system. Tuning of ion optics and related parameters such as beam focusing and achromaticity, and the adjustment of the magnetic rigidity setting are generally performed based on these measurements using the present ion detectors.

Figure 10:
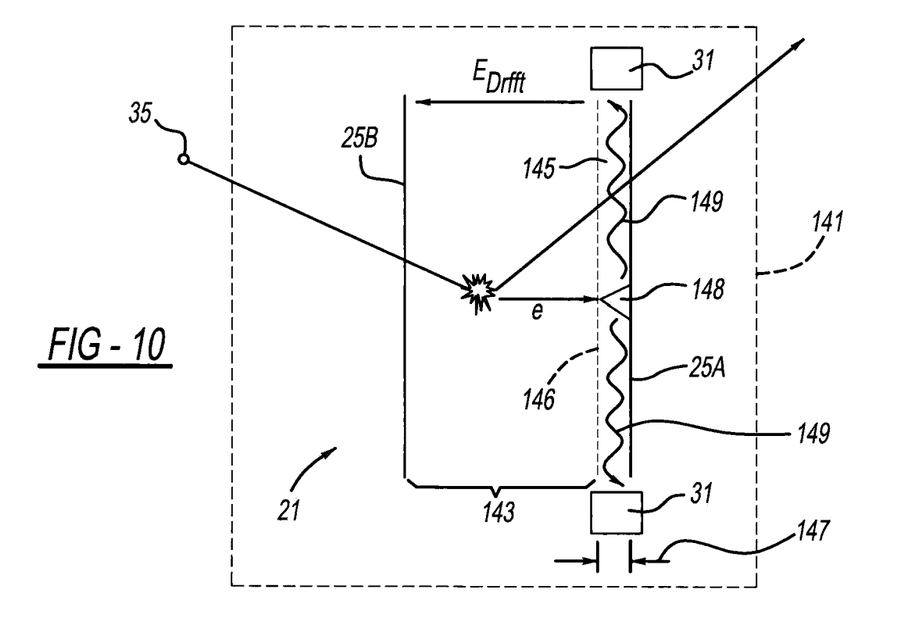
FIG. 10 is a diagrammatic side view showing the OPPAC operating as a position-sensitive high pressure scintillation counter for an exemplary Compton camera application.
Figure 11:
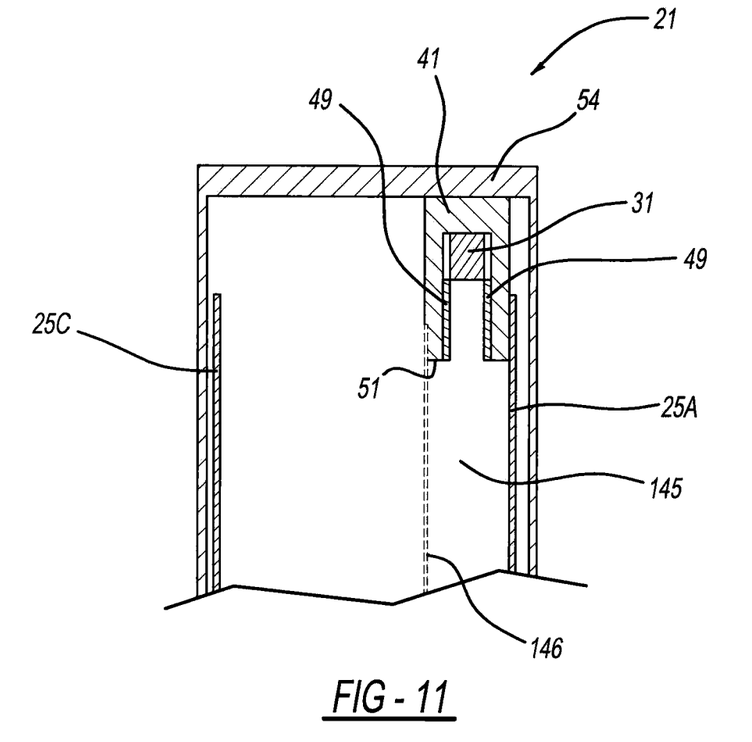
FIG. 11 is a fragmentary and diagrammatic cross-sectional view showing the OPPAC in an optional case.

In medical imaging, OPPAC detector 21 may be used as a position-sensitive gamma detector, for Compton camera 141 applications. An example of an OPPAC detector setup for gamma detection is shown in FIG. 10. Compton camera 141 uses kinematics of Compton scattering to produce a source image without the use of a mechanical collimator. Higher detection efficiency may be achieved as compared to the long-established conventional Anger camera. In the present configuration, OPPAC 21 acts as scatter/analyzer detector. The Compton interaction occurs in a drift volume 143 where photon 35 transfers part of its energy (scattering) to the filling gas in the form of ionization electrons e. These electrons are drifted toward a scintillation region 145, consisting of a small conversion gas gap 147 defined by a fine mesh 146 or grid sheet on top of anode electrode 25A; this conversion gap is preferably equal to or less than 20 mm. In this situation, there are three electrodes, the outer ones being continuous sheets, and the inner one being a mesh or grid. Anode sheet 25A may be a mesh or foil. A high pressure gas is located between anode and cathode sheets 25A and 25B, respectively. Photo-sensors 31 are collimated as discussed hereinabove. The ionization electrons from the gamma interactions in the small conversion gap (less than or equal to 3 cm) are drifted towards the actual OPPAC where the ionization electrons or electron avalanche 148 is then multiplied in the small gas gap (with a gap of approximately 2-3 mm) of the OPPAC by the avalanche process. Electroluminescent light 149 is detected and readout by the arrays of photo-sensors 31 as in the OPPAC described above.

For a high-pressure of approximately 10 bar, Xe is ideally suited as the gas medium for a relative modest counting rate with Compton camera 141, because it offers extremely high resolution and high detection efficiency (high Z). Among other various options, Ar as the main noble gas, plus a low amount of Xe and of $N_2$ as a wavelength shifter represent an efficient solution, providing good detection efficiency, fast response and high electroluminescence yield.

The present radiation detector is advantageous over conventional devices. For example, the present detector detects ionizing particles including charged particles, gamma and neutrons if equipped with a suitable converter, etc. Furthermore, the present detector advantageously improves a signal-to-noise ratio; the readout of the present detector, based on secondary scintillation, provides a better signal-to-noise ratio compared to the readout from a conventional charge-avalanche system because the photo-sensors have extremely high-responsivity to light (down to single photoelectron sensitivity for SiPM), while they have much lower noise. Moreover, if silicone photo-sensor detectors are employed, a broad range of wavelengths can be advantageously detected. Another advantage of the present detector is that gamma rays can be detected. The present detector additionally improves localization position detection as compared to conventional PPACs, and has a high resolution essentially out to the edges of the anode/cathode. Compared to conventional gas-ionization detectors, an optical readout of the present scintillator detectors, including noble gases and relevant gas mixtures, has some noteworthy features: faster pulse propagation (good time resolution), insensitive to electronic noise or RF pick-up problems (since the readout is electrically decoupled from the active volume where the energy is deposited), no space charge limitation (which allows high counting rate and large dynamic range with respect to the particle's mass and energy), and better energy resolution due to a large light yield.

While various constructions have been disclosed, it should be appreciated that other variations may be employed. For example, alternate or additional electronics and/or electrical circuitry may be connected to the optical ion detector. Furthermore, differing superconducting cyclotron and accelerator system components may be employed. While fifty-five photo-sensors per each of the four arrays (over an exemplary active OPPAC area of ten-by-ten $cm^2$) were employed in the exemplary embodiment disclosed hereinabove, at least ten, and more preferably at least fifty photo-sensors are located on each of the four sides of the present detector (depending on the active area dimensions), different quantities can be used although certain advantages may not be achieved. Specific photo-sensors and gas compounds have been disclosed, but alternate sensors and compounds may be employed, however, some benefits may not be realized. It is intended by the following claims to cover these and any other departures from the disclosed embodiments which fall within the true spirit of this invention.

The invention claimed is:
1. A radiation detector system comprising:
substantially parallel electrode sheets separated by a gap; and
a scintillating gas located in the gap; and
photo-detectors located adjacent edges of the gap between the electrode sheets;
the photo-detectors operably detecting scintillation light produced during an avalanche process initiated by an ionizing radiation particle crossing the gap between the electrode sheets;
a collimator wall located between an adjacent pair of the photo-detectors and the collimator wall extending inwardly beyond the adjacent pair of the photo-detectors; and the electrode sheets, gas and photo-detectors being adapted to act as a transmission detector for identification of heavy ions with minimal straggling on an impinging beam.

2. The detector system of claim 1, further comprising:
a scintillating gas located in the gap; and
the walls located between the photo-detectors operably collimating the scintillation light reaching the photo-detectors.

3. The detector system of claim 2, wherein the collimating wall is reflective aluminum or Teflon.

4. The detector system of claim 1, wherein at least one of the electrode sheets includes foil, and the photo-detectors are photodiode sensors.

5. The detector system of claim 1, wherein at least one of the electrode sheets includes foil, and the photo-detectors are position-sensitive gas photomultipliers.

6. The detector system of claim 2, wherein an open end defined between each adjacent pair of the walls faces toward an open center between arrays of the photo-detectors.

7. The detector system of claim 1, wherein:
the gap between the electrode sheets is 10 mm or less; and
the scintillating gas located in the gap includes at least one of: $CF_4$, Xe, Ar, TEA, TMEA, $N_2$, $CO_2$, $CH_4$, noble gas, and mixtures thereof.

8. The detector system of claim 1, wherein the photo-detectors detect gamma rays, and the gap is a drift gap between an outer foil one of the electrodes and a mesh middle one of the electrodes, further comprising another gap between the mesh middle electrode and another outer foil one of the electrodes.

9. The detector system of claim 1, further comprising a programmable controller connected to the photo-detectors, and instructions stored in non-transient computer memory determining a horizontal and vertical position of ionic particle fragmentation as optically sensed by the photo-detectors.

10. The detector system of claim 1, further comprising a particle accelerator, the electrode sheets and photo-detectors receiving a particle from the accelerator.

11. The detector system of claim 1, further comprising a Compton camera, the electrode sheets and photo-detectors being located within the Compton camera.

12. The detector system of claim 1, wherein the system is part of a non-destructive imaging radiography device, and the sheets are foils.

13. A radiation detector system comprising:
a cathode foil;
an anode foil spaced apart from the cathode foil;
a scintillating gas between the cathode and anode foils;
optical sensors positioned around a central portion between the foils and adjacent multiple peripheral edges of each of the foils; and
collimating walls located between adjacent pairs of the optical sensors adjacent the multiple peripheral edges.

14. The detector system of claim 13, wherein the collimating walls are reflective aluminum or Teflon.

15. The detector system of claim 13, wherein there are at least four arrays of the optical sensors with each array being linearly aligned, and the arrays surround the central portion.

16. The detector system of claim 13, wherein the optical sensors are gas photomultipliers located outboard of opposite peripheral edges of and between parallel planes defined by the foils.

17. The detector system of claim 13, wherein the optical sensors are photodiodes located outboard of opposite peripheral edges of and between parallel planes defined by the foils.

18. The detector system of claim 13, wherein:
a gap between the foils is 10 mm or less, and the foils are parallel to each other; and
the scintillating gas includes at least one of: $CF_4$, Xe, Ar, TEA, TMEA, noble gas, and mixtures thereof.

19. The detector system of claim 1, further comprising a superconducting cyclotron coupled to a fragment separator, the foils and optical sensors being located adjacent the fragment separator, and the superconducting cyclotron sending an ion beam having an energy of at least 100 MeV to the fragment separator.

20. A method of using a detector, the method comprising:
(a) emitting a charged particle at a gas located between an anode sheet and a cathode sheet;
(b) creating scintillation light at the gas between the sheets during an avalanche process triggered by the charged particle crossing a gas gap and releasing ionization electrons in the gas;
(c) optically sensing the scintillation light with sensors located adjacent opposite peripheral portions of at least one of the sheets, and sending an associated electrical output signal to a programmable controller; and
(d) determining a position of the charged particle by sensing electroluminescent light during transmission using photo-detectors located adjacent peripheral edges of the gas gap.

21. The method of claim 20, wherein:
at least one of the sheets includes foil;
the sensors are photodiodes or photo-multipliers;
further comprising linearly aligning multiples of the sensors along each edge of the foil.

22. The method of claim 21, further comprising collimating at least some of the scintillation light prior to the light reaching the sensors.

23. The method of claim 20, further comprising using the programmable controller to determine horizontal and vertical position of the charged particles optically sensed by the sensors.

24. The detector system of claim 1, wherein the system is a hadron-therapy medical transmission detector.

25. The detector system of claim 1, wherein the system is a proton radiography transmission detector.

26. The detector system of claim 1, wherein the collimator wall is reflective.

27. The detector system of claim 13, wherein the collimating walls are reflective to guide light toward the optical sensors.

* * * * *